United States Patent [19]

Naderhoff et al.

[11] Patent Number: 5,369,152
[45] Date of Patent: Nov. 29, 1994

[54] URETHANE MODIFIED WATERBORNE DISPERSIONS

[75] Inventors: Bryan A. Naderhoff, Durham; Timothy P. Takas, Cary; David P. Allerton, Raleigh, all of N.C.

[73] Assignee: Reichhold Chemicals, Inc., Durham, N.C.

[21] Appl. No.: 46,637

[22] Filed: Apr. 14, 1993

Related U.S. Application Data

[63] Continuation-in-part of Ser. No. 618,489, Nov. 27, 1990, Pat. No. 5,204,385.

[51] Int. Cl.$^5$ .................... C08K 3/20; C08L 63/02
[52] U.S. Cl. .................................................. 523/415
[58] Field of Search ........................................ 523/415

[56] References Cited

U.S. PATENT DOCUMENTS

| | | | |
|---|---|---|---|
| 3,804,786 | 4/1974 | Sekmakas | 523/415 |
| 4,260,716 | 4/1981 | Christenson et al. | 528/45 |
| 5,089,100 | 2/1992 | Debroy et al. | 523/417 |

Primary Examiner—Melvyn I. Marquis
Assistant Examiner—D. Aylward
Attorney, Agent, or Firm—Rodman & Rodman

[57] ABSTRACT

An excess of a urethane modified polyfunctional epoxide compound is reacted with a tertiary amine salt to form a quaternized epoxy resin. The quaternized epoxy resin is then dispersed in water. Therein the residual epoxy functionality is reacted with a polyamine, to form a waterborne epoxy resin system. The urethane modification leads to significant improvements in properties such as dry rate, adhesion, and chemical resistance, particularly aviation hydraulic fluid resistance. The waterborne dispersions of the urethane modified epoxy resins are useful in coating, ink and adhesive applications at ambient and elevated temperature curing conditions.

12 Claims, No Drawings

URETHANE MODIFIED WATERBORNE DISPERSIONS

This is a continuation-in-part of application Ser. No. 618,489 filed Nov. 27, 1990, now Pat. No. 5,204,385.

BACKGROUND OF THE INVENTION

1. Field of the Invention

This invention relates to urethane modified water dispersible epoxy resin systems and their method of preparation.

2. Description of the Prior Art

In the prior art, the problems of viscosity control and gelation during the processing of waterborne epoxy amine adducts are often discussed. For instance, U.S. Pat. No. 4,608,405 to DeGooyer discloses the use of large excesses of amine which must later be vacuum stripped from the product (column 5, lines 15–33). U.S. Pat. No. 5,089,100 to Debroy discloses the partial defunctionalization of the epoxy with a secondary monoamine prior to the polyamine reaction in order to prevent gelation (column 3, lines 48–50). U.S. Pat. No. 5,096,556 to Corrigan discloses the use of blocked polyamines (ketimines) and the use of excess amine to minimize the danger of gelation (column 3, lines 64–68 and column 4, lines 48–53).

U.S. Pat. No. 5,204,385 to Naderhoff discloses the preparation and use of amine functional curing agents that are suitable for crosslinking epoxy resins in waterborne systems.

Although waterborne epoxy systems have been in commercial use for nearly 20 years, disadvantages such as slow cure rate, short pot life, and poor chemical resistance have limited their widespread acceptance.

It is an objective of the present invention to provide improvements in cure speed, adhesion, and chemical resistance in waterborne dispersions, and to provide an improved process for preparing waterborne dispersions.

SUMMARY OF THE INVENTION

The present invention relates to reaction of urethane modified polyfunctional epoxide compounds with a tertiary amine salt to form a quaternized epoxy resin that is dispersed in water and wherein the residual epoxy functionality is then reacted with a polyamine, to form a waterborne epoxy resin system.

The urethane modification leads to significant improvements in properties such as dry rate, adhesion, and chemical resistance, particularly aviation hydraulic fluid resistance.

The waterborne dispersions of the urethane modified epoxy resins are useful in coating, ink and adhesive applications at ambient and elevated temperature curing conditions.

DESCRIPTION OF THE PREFERRED EMBODIMENTS

The waterborne dispersions of the present invention are prepared by:
1. reacting an excess of urethane modified polyfunctional epoxide compound with a tertiary amine salt to form a quaternized epoxy resin;
2. dispersing the quaternized epoxy resin in water; and
3. reacting the residual epoxy functionality in the quaternized epoxy resin with a polyamine containing primary amine groups to form a chain extended urethane modified waterborne epoxy resin dispersion.

Suitable polyfunctional epoxide compounds for the present invention are disclosed in U.S. Pat. No. 5,204,385 to Naderhoff, and are incorporated by reference herein. The term "polyfunctional epoxide compound" includes within its meaning epoxy resins.

The epoxides generally used to prepare the waterborne dispersions are glycidyl ethers of polyhydric phenols. Preferred epoxides are the diglycidyl ether of 2,2-bis(hydroxyphenyl) propane and the glycidyl ethers of phenolformaldehyde condensates, which are also known respectively as Bisphenol A and Bisphenol F epoxy resins. Particularly suitable epoxides are higher molecular weight analogs of the diglycidyl ether of Bisphenol A which have epoxy equivalent weights ranging from 300 to 1500.

The epoxy resin can be urethane modified by reacting the secondary hydroxyl groups contained on the epoxy backbone with an isocyanate functional compound. The isocyanate can be reacted in a number of ways, however, the preferred method is to react the isocyanate during the epoxy advancement reaction.

The term "epoxy advancement reaction" is well known in the art and relates to the increase in molecular weight when, for example, the epoxy groups on the diglycidyl ether of Bisphenol A are reacted with Bisphenol A to increase the molecular weight, and also the viscosity. This method of reacting the isocyanate is preferred because the isocyanate can be added when the reaction temperature and resin viscosity are low. This avoids the possibility of forming gel particles when the isocyanate is added at high temperatures and high resin viscosity.

Suitable isocyanate functional compounds are monomeric isocyanates such as isophorone diisocyanate, diphenylmethane 4,4'-diisocyanate, 2,4-toluene diisocyanate, 1,6-hexamethylene diisocyanate, bis(4-isocyanatocyclohexyl) methane, and trimethylhexamethylene diisocyanate. Suitable isocyanate compounds also include isocyanate prepolymers and polymeric isocyanates.

The level of urethane modification is limited by viscosity. High levels of urethane modification will lead to high viscosities, and can cause gelation of the epoxy resin. The amount of isocyanate functional compound generally varies from about 0.5 to 15 percent, and preferably about 1 to 10 percent of the epoxy resin weight.

Suitable tertiary amines used to prepare the tertiary amine salts are also disclosed in U.S. Pat. No. 5,204,385 to Naderhoff, and are incorporated by reference herein. The preferred tertiary amines are cyclic compounds such as 4-methyl morpholine or 4-ethyl morpholine.

The preferred acids used to prepare the tertiary amine salt are low molecular weight acids such as acetic acid, formic acid, or lactic acid. The molar ratio of tertiary amine to acid is about 1 to 1.

The reaction of the tertiary amine salt with the urethane modified epoxy resin is conducted at temperatures of about 40° to 100° C., with about 50° to 80° C. being preferred. The amount of tertiary amine salt can vary from about 0.05 to 0.8 moles of amine salt for each epoxy equivalent. The preferred amount of tertiary amine salt is about 0.1 to 0.5 moles of amine salt for each epoxy equivalent.

In order to maintain a workable viscosity, on the order of less than about 25,000 centipoises (cps), and preferably less than about 20,000 cps, it is advantageous to conduct the tertiary amine salt/epoxy reaction in the presence of a solvent. Suitable solvents are glycol ethers, esters of glycol ethers, alcohols, and water. These would include solvents such as ethylene glycol monopropyl ether, propylene glycol t-butyl ether, propylene glycol monopropyl ether, propylene glycol monomethyl ether acetate, ethylene glycol butyl ether acetate, diacetone alcohol, methyl ethyl ketone and benzyl alcohol. Also, nitroparaffins such as nitroethane or nitropropane are suitable solvents. Water can be used as a co-solvent.

The completion of the reaction of the tertiary amine salt with the urethane modified polyfunctional epoxide compound to form a quaternized epoxy resin (an epoxy resin which contains quaternized amine salt groups as well as epoxy groups) can be monitored by measuring the residual epoxy concentration, until substantially all of the tertiary amine salt has been reacted, preferably at least 80%, and more preferably at least 90% or greater conversion.

At the desired reaction conversion the quaternized epoxy resin is dispersed in water. The amount of water in which the quaternized epoxy resin or quaternized polyfunctional epoxide compound is dispersed is based upon the amount of solids content in the quaternized compound. Preferably, the total weight of the water and the polyfunctional epoxide compound contains about 10 to 70 weight % and more preferably about 20 to 60 weight % of the solids content in the polyfunctional epoxide compound.

In some epoxy titration measurements, such as ASTM 1652, the amine salt will be titrated in addition to the epoxide groups. In this case it is necessary to subtract out the contribution of the amine salt in order to obtain an accurate value for the epoxide content.

Immediately after the quaternized epoxy resin is dispersed in water, a polyamine containing primary amine groups is reacted with the residual epoxy groups or residual epoxy functionality of the resin. It is necessary to add the amine immediately after the quaternized epoxy is dispersed in water in order to minimize the possible loss of epoxy functionality due to hydrolysis side reactions.

In general, the same polyamines that can be used in non-waterborne systems as epoxy curing agents can be used to prepare the waterborne dispersions of the present invention. Examples of suitable polyamines are disclosed in U.S. Pat. No. 5,204,385 to Naderhoff, which is incorporated by reference herein and include ethylene diamine, diethylene triamine, triethylene tetramine, hexamethylene diamine, 2-methyl pentamethylene diamine, trimethylhexamethylene diamine, and 1,3-pentanediamine.

Another suitable class of polyamines are polyoxyalkylamines such as polyoxypropylene triamine which is available from Texaco Chemical Co. under the trademark JEFFAMINE TM. The most preferred polyamines are cyclic amines such as isophorone diamine, m-xylene diamine, 1,2-diaminocyclohexane, 1-(2-amino ethyl) piperazine, and bis(paraaminocyclohexyl) methane.

The advantage of this process is that the epoxy and polyamine reaction occurs after dispersion in water. This allows the polyamine and epoxy reaction to occur within the dispersed epoxy particles, and the ratio of polyamine to epoxy groups can be varied widely without gelation. Another advantage is that the necessity of using blocked amines or excess amine is eliminated.

The amount of polyamine can range from about 0.1 to 1.0 mole of polyamine for each epoxy equivalent. The preferred range is about 0.2 to 0.6 moles of polyamine for each epoxy equivalent.

The waterborne dispersions of the present invention can be prepared in a single reaction vessel or in multiple vessels. In the multi-vessel process, the epoxy-tertiary amine salt reaction is carried out in the first vessel. After the epoxy and tertiary amine salt reaction has been completed, the reaction product is pumped or transferred to a second vessel which contains water, and is dispersed therein.

After the epoxy is dispersed in water, the polyamine is added to the dispersion. The multi-vessel process is preferred over the single vessel process because the multi-vessel process leads to increased yields and reduced cleaning requirements between batches. It is also possible when using a two vessel process to disperse the quaternized epoxy resin directly into a solution of the water and the polyamine. In this manner, the epoxy dispersion and epoxy-polyamine reaction takes place simultaneously.

The waterborne dispersions of the present invention have small finely-divided particle sizes which typically vary from about 0.05 to 0.15 microns. The dispersions have excellent stability properties and can be stored in excess of 3 months at 120° F.

The waterborne dispersions can be formulated with other epoxy resins and/or resins containing blocked isocyanate groups to yield systems which are useful in coating, ink, and adhesive applications. These systems can be used at ambient temperature or at elevated temperatures generally of about 140° to 400° F. for baking applications.

The waterborne dispersions of the present invention can be used as coatings for furniture, wood, concrete floors, high performance architectural coatings, aerospace primers, industrial-maintenance primers, automotive refinish primers, and cathodic electrodeposition primers.

The compositions of the present invention offer further improvement in the areas of cure speed, adhesion, and chemical resistance. Specifically, the inventive compositions have improved resistance to aviation hydraulic fluids, such as SKYDROL ® (Monsanto Co.). Resistance to aviation hydraulic fluids is an important property for aerospace coatings. SKYDROL ® is acidic in nature and to be fire resistant contains phosphate esters, and consequently is corrosive. Therefore, the coatings coming in contact with SKYDROL ® have to be resistant to these corrosive effects.

The following examples illustrate the preparation and use of the inventive waterborne dispersions. In the examples, and throughout the specification, all parts and percentages are by weight, unless otherwise indicated.

EPOTUF ® 37-140 is the diglycidyl ether of 2,2-bis(4-hydroxyphenyl) propane with an average molecular weight of 370, and is commercially available from Reichhold Chemicals, Inc.

EPOTUF ® 37-143 is a dispersion of EPOTUF ® 37-140 modified with a non-ionic surfactant at 78% solids in water, and is also commercially available from Reichhold Chemicals, Inc. The average epoxy equivalent weight on a solution basis is 256.

EXAMPLE 1

A urethane modified, waterborne dispersion was prepared by charging 148.1 grams of EPOTUF ®

37-140 (Reichhold Chemicals, Inc.) to a 1 liter reaction vessel equipped with stirrer, nitrogen blanket, temperature controller, condenser, and heating mantle. 45.0 grams of Bisphenol A was charged, and the temperature was increased to 80° C., at which time a mixture of 3.3 grams of isophorone diisocyanate and 3.3 grams of bis(4-isocyanatocyclohexyl) methane was added dropwise to the vessel. After mixing for 15 minutes, 0.1 gram of ethyl triphenylphosphonium acetate (70% in methanol) was added and the temperature was increased over 1 hour to 172° C. After 30 minutes at 170°–175° C., the epoxide equivalent weight was 515, in accordance with ASTM 1652, Test Method B. Heating was discontinued, and 50.0 grams of 2-propoxyethanol was added dropwise. The resin solution was cooled to 63° C. and 33.3 grams of a tertiary amine salt prepared by mixing 20.0 grams of water, 8.3 grams of 4-methyl morpholine, and 5.0 grams of acetic acid was added to the vessel. After 1 hour at 65° C., the epoxide equivalent weight ("EEW") was measured by titration as 716 on a solution basis (903 EEW when corrected for amine salt contribution). Over 6 minutes, 255.3 grams of deionized water was charged to the vessel which formed a dispersion of quaternized epoxy in water. A mixture of 9.8 grams of m-xylene diamine and 12.4 grams of isophorone diamine was added to the vessel, and stirring was continued for 30 minutes at 45° C. The final product was a stable dispersion with a solids content of 41%, a viscosity of 60 cps at 25° C., and a particle size of 0.1 micron.

EXAMPLE 2

For comparison purposes, a waterborne dispersion was prepared identical to Example 1 except that no isocyanate monomers were added to the reaction.

EXAMPLE 3

Separate clear coatings were prepared from each of the dispersions of Examples 1 and 2 using the formulation shown below:

| Material | Weight (grams) |
| --- | --- |
| Dispersion from Ex. 1 | 85.0 |
| Propylene glycol t-butyl ether | 5.9 |
| 2-butoxyethanol | 9.3 |
| deionized water | 20.7 |
| EPOTUF ® 37-143 | 12.2 |
| Total | 133.1 grams |

Drawdowns were prepared from each coating formulation on glass plates and cold rolled steel with a wet film thickness of 3–4 mils and a dry film thickness of 1.5 mils. Shown below is data for the dry times, Sward hardness development, and the resistance to SKYDROL ® hydraulic fluid.

|  | Example 1 Coating | Example 2 Coating |
| --- | --- | --- |
| Dry time* (hours) | | |
| Set to Touch | 0.25 | 0.50 |
| Through Dry | 1.25 | 3.50 |
| Dry Hard | 3.00 | 5.00 |

*Measured with Gardner Circular Drying Time Recorder (Gardner Co.). See Paint Testing Manual by Gardner & Sward, p. 115 (12th edition, March 1962).

| Sward Hardness* after | | |
| --- | --- | --- |
| 1 day | 18 | 12 |
| 3 days | 26 | 22 |
| 7 days | 32 | 28 |

*Measured with Sward Rocker Hardness Test. See also Paint Testing Manual by Gardner & Sward, p. 138 (12th edition, March 1962).

| SKYDROL ® LD-4 Resistance Exposure Time (hours) @ Temp. | Example 1 | Example 2 |
| --- | --- | --- |
| 24 at 77° F. | Slight* Softening | Severe Softening |
| 1 at 140° F. (scribed) | Slight* Softening | Severe Softening and Delamination |

*Recovered after 1 hour.

As shown above, the urethane modification results in faster dry times, faster Sward hardness development, and better resistance to SKYDROL ® hydraulic fluid at room temperature and elevated temperature.

EXAMPLE 4

Anticorrosive primers were prepared using the waterborne dispersions prepared in accordance with Example 1 and Example 2 using the following formulation:

| | Ingredient | Weight (grams) |
| --- | --- | --- |
| | PART A - Curing Agent Component | |
| (a) | Waterborne Dispersion from Example 1/Example 2 | 194.4 |
| (b) | Defoamer - (Patcote 841 - Patco Specialty Products) | 2.9 |
| (c) | Propylene glycol t-butyl ether | 33.0 |
| (d) | 2 butoxyethanol | 33.0 |
| (e) | Propylene glycol phenyl ether | 11.3 |
| (f) | Red iron oxide | 100.7 |
| (g) | Wollastonite (magnesium silicate) | 230.4 |
| (h) | Modified zinc phosphate (Heucophos ZBZ - Heucotech Co.) | 100.0 |
| (i) | Waterborne dispersion from examples | 227.1 |
| (j) | 2-butoxyethanol | 21.2 |
| (k) | Deionized water | 32.2 |
| | Total | 986.2 grams |
| | PART B - Epoxy Component | |
| (l) | EPOTUF ® 37-143 | 82.1 |
| (m) | Deionized water | 92.9 |
| (n) | 3 glycidoxypropyltrimethoxysilane | 3.2 |
| | Total | 178.2 grams |

Constituents (a), (b), (c), (d) and (e) were premixed for about 3 minutes at low agitation of about 200 rpm. Thereafter, pigment constituents (f), (g) and (h) were added and the mixture was agitated at high speeds of about 800 to 1000 rpm until the pigment particles dispersed to a size of about 30 microns. This was then followed by the addition of constituents (i), (j) and (k) to complete the formulation of the curing agent component.

Paint was prepared by mixing the 986.2 parts of the curing agent component—Part A with 178.2 parts of the epoxy component—Part B. Films were sprayed on cold rolled steel panels and were allowed to cure for seven days at room temperature. The dry film thickness was 1 mil. The coatings were tested for water resistance and wet adhesion according to Military Specification Mil-P-53030A, which covers waterborne epoxy anticorrosive primers. The results are shown below:

| Test | Conditions | Results Example 1 | Example 2 |
|---|---|---|---|
| Wet Adhesion | 24 hour water immersion, scribed, room temperature | 100% Adhesion | 90% Adhesion |
| Water Resistance | 7 days water immersion, room temperature | No wrinkling or blistering | Severe wrinkling and blistering |

As shown above, the urethane modified waterborne dispersion from Example 1 has improved wet adhesion and water resistance compared to Example 2, which contains no urethane modification. Primer prepared using the Example 1 composition passed the wet adhesion and water requirements of Mil. Spec. Mil-P-53030A, whereas primers prepared from Example 2 did not.

EXAMPLE 5

A urethane modified, waterborne dispersion which has highly crosslinked particles was prepared by charging 156.6 grams (0.84 equivalents epoxy) of EPO-TUF® 37-140 to a 1 liter flask equipped as in Example 1.

47.5 grams (0.42 equivalents hydroxyl) of Bisphenol A was added to the flask. The temperature was increased to 80° C., and 3.5 grams of isophorone diisocyanate and 3.5 grams of bis(4-isocyanatocyclohexyl) methane was added to the vessel. After mixing for 30 minutes, 0.12 grams of ethyl triphenylphosphonium acetate (70% in methanol) was added and the temperature was increased to 177° C. over 30 minutes. After 30 minutes at 170°–175° C., the epoxide equivalent weight was 538 in accordance with ASTM 1652, Test Method B. Heating was discontinued, and 30 grams of benzyl alcohol was slowly added while cooling. At 71° C., 35.0 grams of a tertiary amine salt prepared by mixing 21 grams of deionized water, 8.75 grams of 4-methyl morpholine, and 5.25 grams of glacial acetic acid was added. After 70 minutes at 65° C., the epoxide equivalent weight of the solution was 740 (963 EEW when corrected for amine salt contribution). Next, 269 grams of deionized water was added over 11 minutes. Immediately after the water addition, 5.3 grams (0.039 moles) of m-xylene diamine and 6.7 grams (0.039 moles) of isophorone diamine were added to the vessel, and stirring was continued for 2 hours while cooling to 25° C. The final product was a stable dispersion with an opalescent appearance. The dispersion had a solids content of 42.8% and a viscosity of 90 cps at 25° C.

What is claimed is:

1. A method for preparing a urethane modified waterborne dispersion comprising:
   (a) reacting an excess amount of a urethane modified polyfunctional epoxide compound with a tertiary amine salt to form a quaternized polyfunctional epoxide compound with unreacted epoxy functionality;
   (b) dispersing the quaternized polyfunctional epoxide compound in water; and
   (c) reacting all the residual epoxy functionality in the quaternized polyfunctional epoxide compound with a polyamine containing primary amine groups to form a urethane modified waterborne dispersion.

2. The method of claim 1 wherein the polyfunctional epoxide compound is urethane modified by reacting an isocyanate-containing compound with the secondary hydroxyls contained in the polyfunctional epoxide compound.

3. The method of claim 2, wherein the isocyanate is reacted during the epoxide advancement reaction.

4. The method of claim 3, wherein the isocyanate-containing compound is selected from the group consisting of monomeric isocyanates, isocyanate prepolymers and polymeric isocyanates.

5. The method of claim 1, wherein the ratio of the amine salt to the polyfunctional epoxide compound is about 0.05 to 0.8 moles of tertiary amine salt for each epoxide equivalent.

6. The method of claim 1, wherein the total weight of the water and the polyfunctional epoxide compound contains about 10 to 70% by weight of the solids content in the polyfunctional epoxide compound.

7. The method of claim 1, wherein the amount of polyamine varies from about 0.1 to 1.0 mole of polyamine for each epoxide equivalent.

8. A urethane modified waterborne dispersion comprising the reaction product of a polyamine containing primary amine groups with the residual epoxy functionality of a quaternized polyfunctional epoxide compound; wherein said quaternized polyfunctional epoxide compound with unreacted epoxy functionality is the reaction product of an excess amount of a urethane modified polyfunctional epoxide compound with a tertiary amine salt.

9. The urethane modified waterborne dispersion of claim 8, wherein the urethane modified polyfunctional epoxide compound is the reaction product of an isocyanate-containing compound with the secondary hydroxyls contained in the polyfunctional epoxide compound.

10. The urethane modified waterborne dispersion of claim 8, wherein the isocyanate-containing compound is selected from the group consisting of monomeric isocyanates, isocyanate prepolymers and polymeric isocyanates.

11. The urethane modified waterborne dispersion of claim 8, wherein the ratio of the amine salt to the polyfunctional epoxide compound is about 0.05 to 0.8 moles of tertiary amine salt for each epoxide equivalent.

12. The urethane modified waterborne dispersion of claim 8, wherein the amount of polyamine varies from about 0.1 to 1.0 mole of polyamine for each epoxide equivalent.

* * * * *